Figure 1:
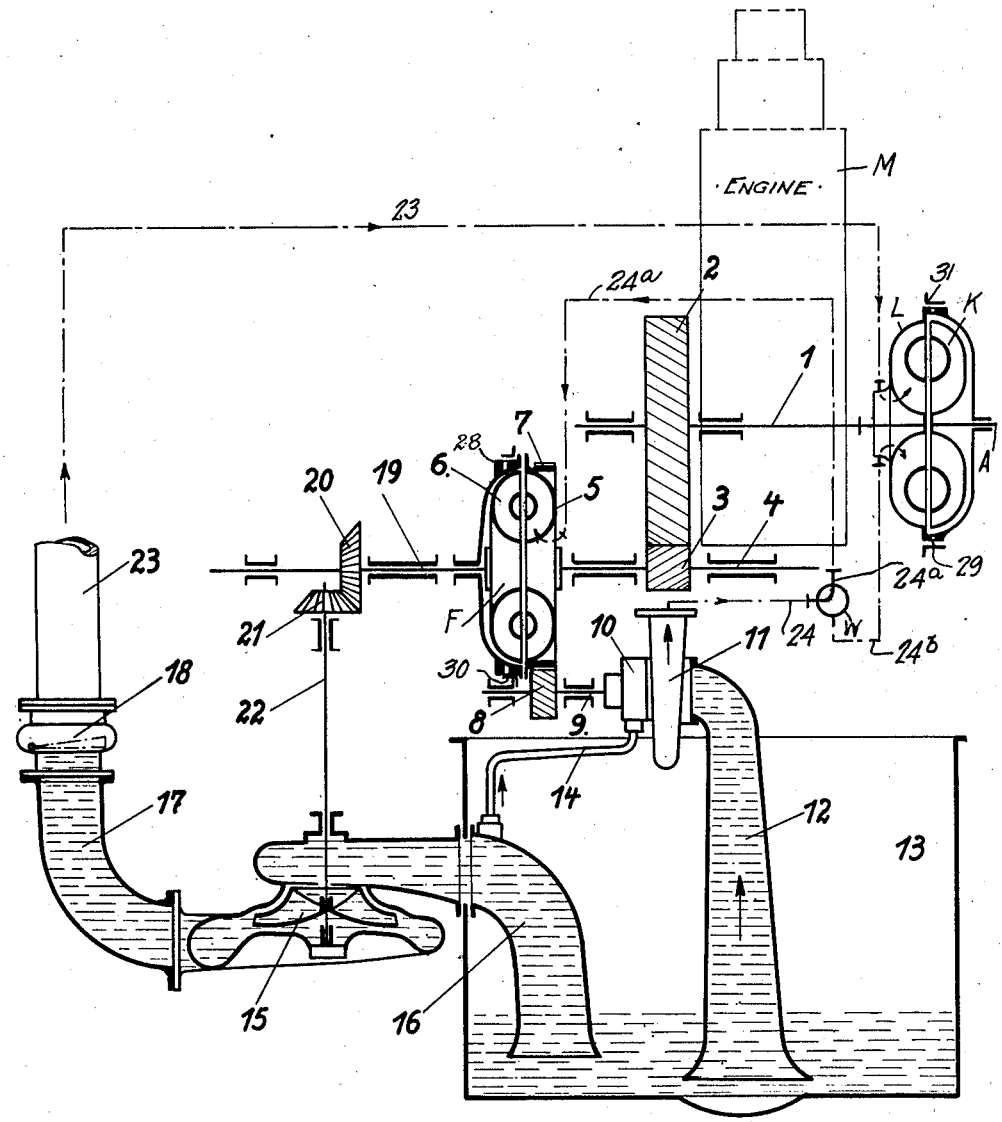

UNITED STATES PATENT OFFICE

GUSTAV BAUER, OF HAMBURG, AND JOHANN NIKOLAUS KIEP, OF ALTONA, GERMANY

HYDRAULIC GEAR AND COUPLING

Application filed April 5, 1929, Serial No. 352,764, and in Germany March 27, 1928.

This invention relates to apparatus in which a hydraulic coupling of the Föttinger type is employed for the transmission of power between a source of power and the load, and in which means are provided for emptying or filling the coupling at will to prevent or permit such power transmission.

The invention relates particularly to the means employed for filling the coupling to effect power transmission and for maintaining the coupling filled to overcome leakage during operation. An apparatus of this general type is shown in the patent to Bauer, Wälde & Kluge, No. 1,757,827, issued May 6, 1930. In the construction there illustrated the working liquid for the coupling is supplied from a collecting tank arranged at a low level, that is, below the hydraulic coupling, and the leakage or discharge from the coupling returns by gravity to the tank. In order to fill the coupling as quickly as possible when it is desired to transmit power, a large pump is employed commonly known as a manœuvring or reversing pump. This pump is at rest during normal operation of the coupling. In addition to this large pump there is employed a smaller pump for replacing the losses by leakage from the coupling during operation. Such smaller pump or leakage pump is continuously operated while the coupling is full and transmitting power.

It is of the greatest importance, particularly for quick reversing, to insure that the manœuvring or reversing pumps shall start instantly and operate effectively when brought into operation to fill the coupling.

The main object of the present invention is to insure, in a reliable manner, a quick and perfect suction for the manœuvring or reversing pumps under all working conditions, that is to say, both when they are running and when they are first started after being stationary.

In carrying out the present invention the manœuvring or reversing pumps are mounted outside of the collecting tank, and means are provided for maintaining a subatmospheric pressure in the conduit connected to such pumps in order that such conduit may be maintained filled with liquid even through the pump is at rest whereby the pump will begin operating on liquid the instant it starts.

In engine installations in which the manœuvring pumps are only run during the filling operation and are stationary during the normal use of the gear or coupling whilst the leakage liquid pumps and lubricating oil pumps are constantly running, the vacuum pump must work and maintain sub-atmospheric pressure in the suction and delivery chambers, even during standstill of the manœuvring pumps, so that they shall be always filled with liquid. In order to enable the vacuum to be maintained in a reliable manner, it is further proposed to provide a check valve in the delivery pipe of the manœuvring pump.

Two examples of plant according to the invention are illustrated in the accompanying drawings, suitable for instance, for an engine installation with a hydraulic gear or coupling for the driving of the working shaft and employing oil as the working liquid, in which the leakage liquid pump and the vacuum pump are constantly rotating with the driving shaft, whilst the manœuvring pump is run only during the filling period and is accordingly connected or disconnected by means of a hydraulic coupling.

Figure 2:
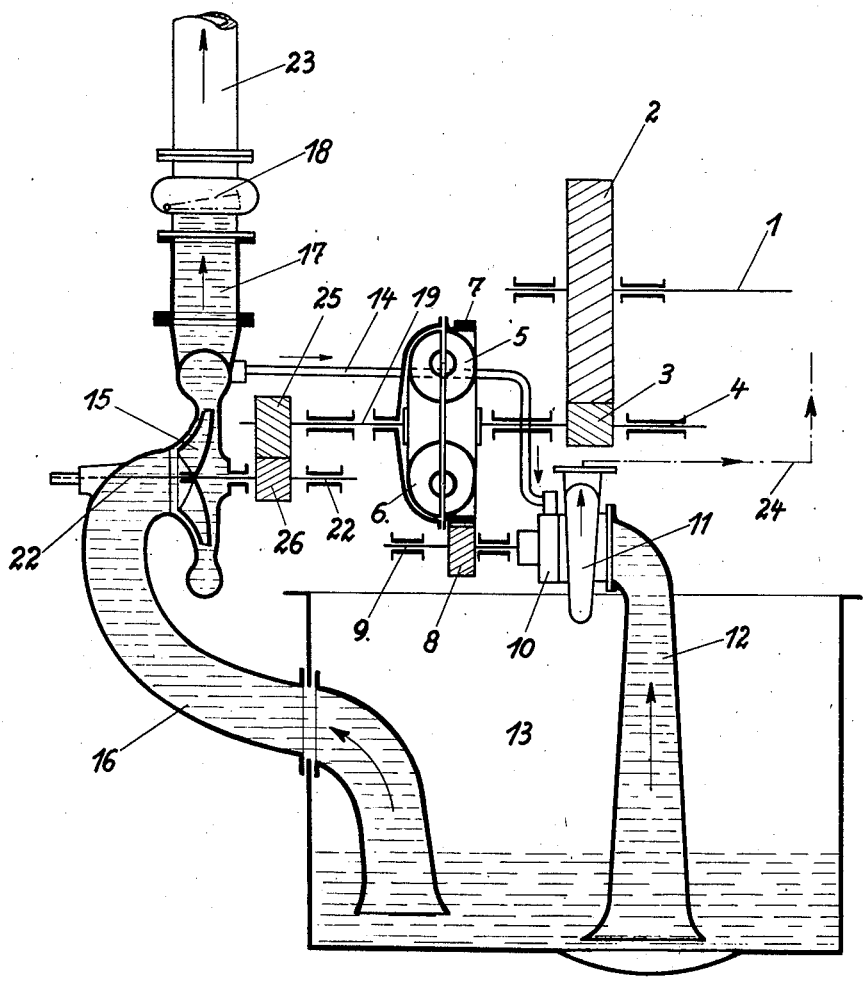

In the accompanying drawings Figs. 1 and 2 are somewhat diagrammatic vertical longitudinal sections through two forms which the invention may assume.

In the arrangements shown in the figures, the shaft A is driven from an engine M through a hydraulic coupling in the well-known manner. As illustrated this coupling has a driving member L secured to the shaft 1 and properly juxtaposed to a driven member K on the main driven shaft A. On the engine shaft 1 there is mounted a gear wheel 2 which engages a second gear wheel 3 on a counter shaft 4. To the latter is secured the driving member 5 of a hydraulic coupling F, and on the circumference of the said member is a toothed rim 7 meshing with a gear wheel 8 on a spindle 9 driving a vacuum pump 10 and a leakage oil pump 11. The driven member 6 of the hydraulic coupling F is rigidly secured to a shaft 19 from which the manœuvring pump 15 is driven by means of bevel wheels 20 and 21 (Figure 1) or spur wheels 25 and 26 (Figure 2), and a spindle 22. 13 is a collector tank into which project the suction pipe 12 of the leakage oil pump 11 and the suction pipe 16 of the manœuvring pump 15. The suction pipe 14 of the vacuum pump 10 is connected, as shown in Figure 1, to the upper part of the suction pipe 16 or, according to Figure 2, to the delivery pipe 17 of the manœuvring pump 15, which is fitted with a non-return or check valve 18. The pipe 24 delivers to a three-way valve W which may be turned to deliver liquid through the pipe 24a to fill the hydraulic coupling F or may be turned to deliver liquid through the pipe 24b to the main hydraulic coupling L, K. Each of these couplings is provided with the well known means for emptying them when it is desired to discontinue the transmission of power. The main coupling L, K has openings 29 in the periphery which may be covered or uncovered by a control ring 31, while the coupling F has similar openings 28 which may be covered or uncovered by a control ring 30. The method of working is as follows:

When the engine is running, the leakage oil pump 11 and the vacuum pump 10 will be rotated through the shaft 1, gear wheels 2 and 3, shaft 4, toothed rim 7, toothed wheel 8 and shaft 9. The pump 11 then draws oil through the pipe 12 from the tank 13 and, when the hydraulic coupling F on the engine shaft 1 is to be filled, delivers it through a pipe 24 valve W and pipe 24a to the coupling 5, 6, thereby starting up the manœuvring pump 15 in the manner above described. Owing to the action of the vacuum pump however, the suction chamber 16 and the delivery chamber 17, up to the check valve 18 will be placed under sub-atmospheric pressure and in that way these chambers will be filled with oil, so that, when the pump 15 is in action, oil will be at once delivered through the pipe 23 into the hydraulic coupling L, K on the shaft 1. When the said coupling is filled, admission to the coupling 5, 6 will be shut off by turning the three-way valve W, that coupling may be emptied and the pump 15 will stop. The pipe 24 is connected to the main hydraulic coupling L, K on the shaft 1, through the pipe 24b so that the pump 11 may replace losses by leakage. The pump 10 still continues however to maintain a sub-atmospheric pressure in the suction and delivery chambers of the pump 15 and in that way keeps them filled with oil, so that the pump 15 will always be ready for working, the check valve 18 being closed. The connection and disconnection of the manœuvring pump 15 by means of the hydraulic coupling 5, 6, or the changing over of the leakage oil pump 11, may be effected automatically or by hand from the engineer's platform by rotating the valve W, in which case the individual valve gear parts could be interlocked.

In the construction according to Figure 1, the manœuvring pump 15, having a vertical spindle 22, is arranged at a lower level than the leakage oil pump 11 and the vacuum pump 10, whilst in the construction according to Figure 2, it is mounted at a slightly higher level and has a horizontal spindle.

By suitably choosing the gear ratio, it is possible to work each pump at the most advantageous speed. The leakage oil pump 11 and the vacuum pump 10 are shown as running at the same speed, but this is not at all essential.

Having now particularly described and ascertained the nature of our said invention and in what manner the same is to be performed, we declare that what we claim is:—

1. A power transmitting mechanism including a coupling of the Föttinger type, a collecting tank, a pump mounted outside of said tank for delivering liquid from said tank to said coupling for filling the latter to effect power transmission, a pump for supplying liquid to said coupling to overcome leakage, means for operatively connecting and disconnecting said first mentioned pump from the source of power, a vacuum pump for maintaining the conduit connected to said first mentioned pump filled with liquid both when said first mentioned pump is running and when it is at rest, and a check valve for preventing return of liquid from the coupling to said first mentioned pump.

2. A power transmitting mechanism including a hydraulic coupling, a collecting tank below said coupling, a pump for delivering liquid from said tank to said coupling for filling the latter to effect power transmission, a pump for supplying liquid to said coupling to overcome leakage, both of said pumps being disposed above the liquid level in said tank, means for operatively connecting and disconnecting said first mentioned pump from the source of power, and a vacuum pump for drawing liquid from said tank up to the suction side of said first mentioned pump, both when said first mentioned pump is running and when it is at rest to permit instant effective operation of said first mentioned pump when connected to said source of power.

3. A power transmitting mechanism including a hydraulic coupling, a collecting tank below said coupling, a pump for delivering liquid from said tank to said coupling for filling the latter to effect power transmission, said pump being disposed above the liquid level in said tank, means for operatively connecting and disconnecting said pump from the source of power, and a vacuum pump for maintaining a sub-atmospheric pressure in the inlet conduit to said first mentioned pump and at the suction side of the latter, both when said first mentioned pump is running and when it is at rest.

In testimony whereof we affix our signatures.

DR. GUSTAV BAUER.
JOHANN NIKOLAUS KIEP.